Nov. 9, 1971   W. E. JENSEN   3,618,187
TIRE PEELING DEVICE
Filed March 13, 1969   2 Sheets-Sheet 1
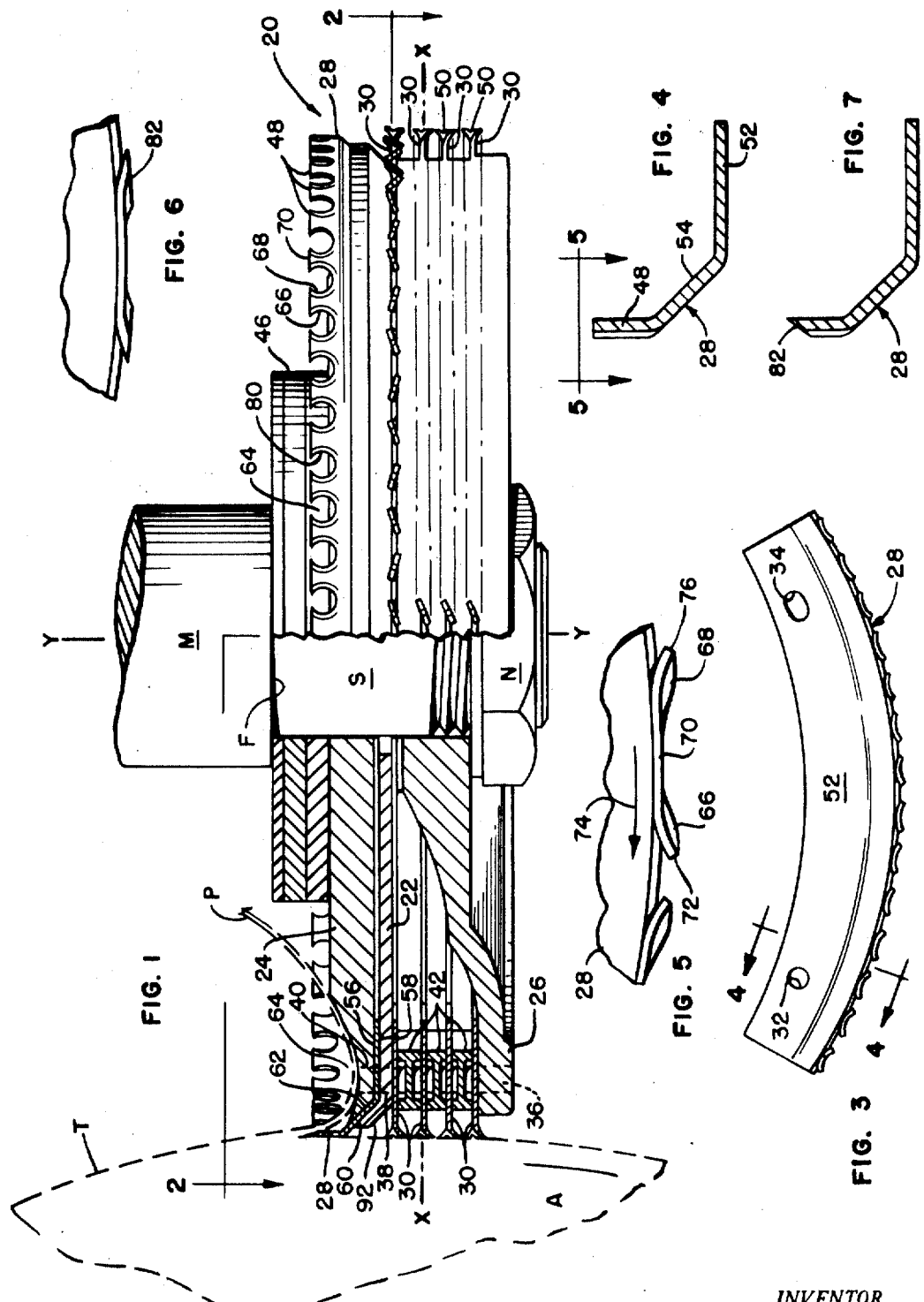
INVENTOR.
WAYNE E. JENSEN
BY *Brown, Jackson, Boettcher & Dienner*
ATTORNEYS

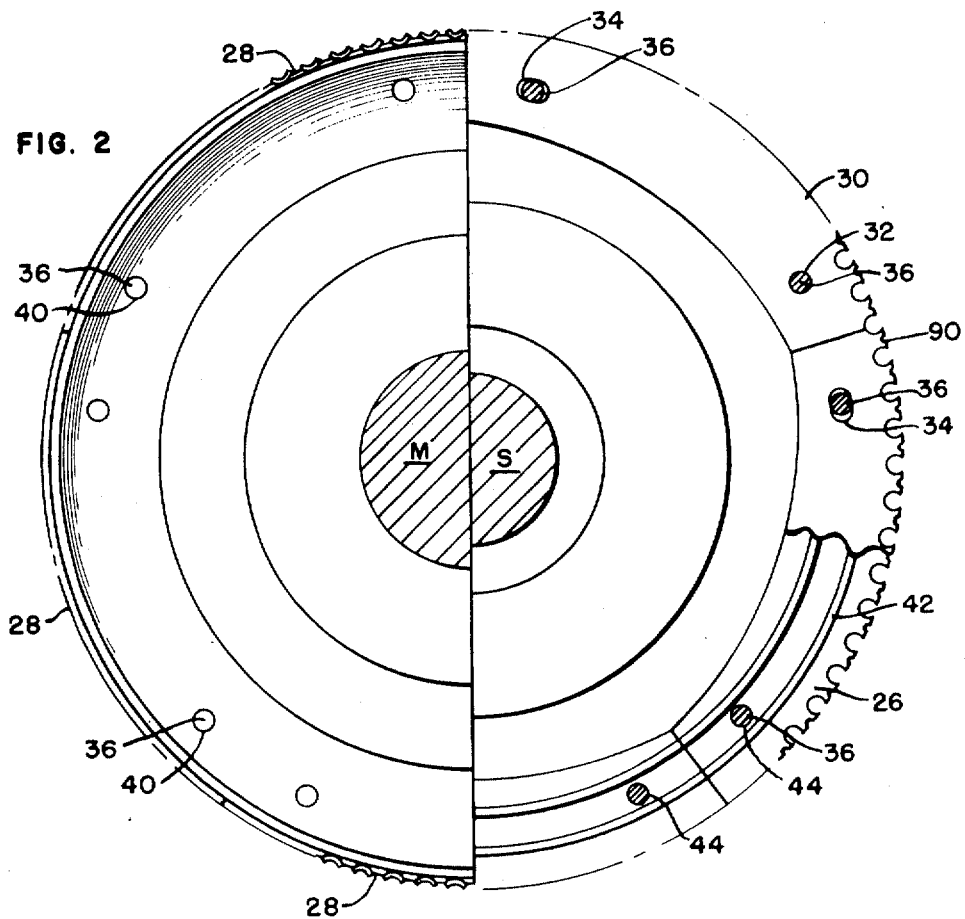
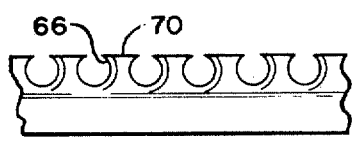
FIG. 8
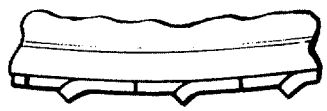
FIG. 9
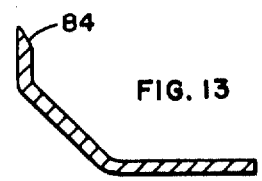
FIG. 13
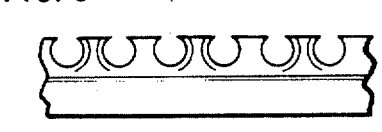
FIG. 10
FIG. 11
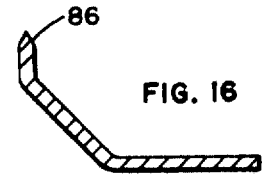
FIG. 16
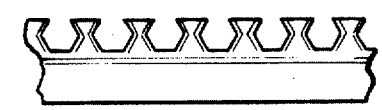
FIG. 14
FIG. 12
FIG. 15
*INVENTOR.*
WAYNE E. JENSEN
BY Brown Jackson,
Boettcher & Diener
ATTORNEYS 3,618,187
TIRE PEELING DEVICE
Wayne Emil Jensen, Homewood, Ill.
(P.O. Box 325, Glenwood, Ill. 60425)
Filed Mar. 13, 1969, Ser. No. 806,856
Int. Cl. B23d 71/00; B26d 1/12
U.S. Cl. 29—79     20 Claims

ABSTRACT OF THE DISCLOSURE

Tire peeling device having axially spaced rows of circumferentially spaced teeth about its periphery, the upper row comprising cutting teeth generally parallel to the axis on which the device rotates and having embossed and/or sharpened diverging side edges which with their outer edges peel the old rubber tread from a worn tire carcass as it is rotated thereagainst on an axis generally perpendicular to the axis on which the device rotates. The other rows of teeth buff the peeled surface of the tire carcass to a texture for effective bonding of new rubber tread thereto. Both the buffing and cutting teeth constitute sheet metal segmented blades removably held between annular plates, the upper one having an annular concave surface which directs the peeled tread off the device to a receiving waste container.

---

This invention relates to devices useful in preparing the carcass of a worn vehicle tire for recapping and/or retreading, and particularly relates to expendable cutting blades and the means which are employed in such devices to removably hold the blades.

In preparing the carcass of a tire for retreading and recapping, it has been conventional to rotate the tire while holding its peripheral surface against a more rapidly rotating tire rasp having peripherally-located teeth which loosen, tear, grind off and otherwise pulverize the old tread and prepare the tire peripheral surface to receive new rubber applied in a subsequent vulcanizing or recapping operation. The rasps used in such grinding or pulverizing operations, although efficient for the purpose, suffered from the disadvantage that their use produced considerable amounts of dust and smoke from which the operator must be protected.

A principal object of the present invention therefore is to provide a novel and improved construction of device which will be effective in removing old tread from worn tire carcasses and will do so in a manner which considerably reduces the problem of dust and smoke emission.

A companion object of the invention is to devise a construction of blades for such a device having cutting teeth which will be effective to not only remove the old tread from a tire carcass with a minimum emission of dust and smoke, but will also be capable of performing the operation rapidly while avoiding the development of excessive heat and at low power consumption.

Still another object of the invention is to provide a construction of tire peeling device and cutting blades therefor which also will be durable, have a long life of usefulness and be practical and economical to manufacture.

A tire peeler construction in accordance with my invention comprises both blades having cutting teeth and blades having buffing teeth which separately, but sequentially, engage the periphery of a worn tire carcass as it is rotated against the more rapidly rotating tire peeling device, the tire being turned on an axis disposed generally normal to the axis on which the device rotates. The teeth of the cutting blades have a generally dove-tail shape and extend generally parallel to the axis of the peeling device so that their outer edge is presented to the tire periphery generally in the plane thereof and the leading edge of said teeth bite into the tire periphery at right angles to the cutting action of said outer edge, the leading edge of the teeth being at a positive rake angle so that in cooperation with their relatively wide upper edge, the teeth effectively remove or peel the old rubber tread from the tire carcass in long strands or peels, rather than abrading the surface with accompanying emission of large amounts of dirt and smoke as characterized in prior devices.

The teeth of the buffing blades may also be of dove-tail shape. However, they are arranged about the rasp so that they lie in generally radial planes, or nearly so, and extend a short radial distance further than the extent of the cutting teeth so that they also engage the peripheral surface of the tire immediately behind said peeling action of the cutting teeth and so impart a fine, buffed texture to the peeled tire surface to which new rubber applied in a subsequent recapping and vulcanizing operation will effectively bond or unite.

Thus it is an important feature of the present invention that a device is provided with cutting teeth which are so arranged and adapted as to effectively remove the old tread from a worn tire carcass by a peeling action and so as to produce strands or peelings having bulk and length as opposed to the products of prior pulverizing or abrading type rasps.

Although the invention contemplates that the teeth of the buffing blades will engage the peeled surface of the tire in a more radial disposition, it is the feature of this invention that the depth of cut of the buffing teeth is sufficiently superficial that it serves to produce the desired fine texture but without producing any substantial amounts of dust and smoke. In actual experiments it has been found that tire peelers provided with cutting and buffing teeth in accordance with the invention promote a reduction of from 50 to 80 percent of the smoke and dust factor which characterized previous tire abrading operations.

It has been further found that when the leading side edge of the cutting teeth are provided a generally concave-like shape so that the inner portion of said side edge recedes in a direction inwardly away from the diverging outer portion of the teeth, this edge may be sharpened to constitute a second cutting surface immediately behind the outer edge of the tooth and which further promotes the peeling action.

Since the cutting action of both the outer edge and this second edge of the cutting teeth feeds into the tire carcass periphery along a plane which generally lies in the path of its rotation as the leading side edge of the tooth cuts across said path relatively low amounts of power are required to effect the peeling action. Thus it is a further feature of the invention that its cutting teeth are able to cut deeply into the tire tread to rapidly remove thick peels with low consumption of power. In addition, the teeth are also highly resistant to breakage and cutting blades in accordance with the invention have a long life.

Furthermore, the dove-tail shape of the cutting teeth provides relatively large spaces between the individual cutting teeth to provide a cooling effect on the peeling action wherefore a tire carcass may be rapidly detreated.

It is a further feature of the invention that at least the leading side edges of some of the cutting teeth are embossed so that a narrow portion along the length of said side edge is raised, offset or deflected outwardly at a small angle which I find considerably improves the bite of the cutting teeth with the benefits of further lowering of power consumption, particularly when removing relatively thick peels from the tire periphery.

Advantageously, the outer edge of the cutting teeth may be also sharpened to improve the bite thereof into the tire tread and the embossed edge of the leading side edges of the teeth also may be honed to improve the cutting action.

Because of the angle at which the outer edge and leading said edge of the cutting teeth bite into the tire periphery in peeling the tread therefrom, it has been found that shredded wire, stone and other foreign objects often found embedded in the tire tread do not provide any great resistance to the cutting action. To the contrary the wearing action which they effect, particularly on the embossed side edges of the cutting teeth serves to automatically hone said embossed side edges reducing them to a finely sharpened edge.

It is also a feature of the invention that the trailing edge of the same or different cutting teeth may also be embossed so as to provide a similarly raised portion along the length thereof. One adavntage flowing therefrom is that the deflected trailing side edge tends to break the peeled strands into shorter lengths which I find are easier to remove than the continuous strand of indefinite length which is otherwise produced.

A further feature of the invention is that both the cutting blades and the buffing blades comprise segments of an annulus which are mounted between holding elements or plates to array their teeth in a circle or spiral about the periphery of the tire peeler. This facilitates both the removal and assembly of the cutting and buffing teeth on the tire peeler as they are consumed with use.

In furtherance of the above recited features of the invention, the blades are constructed of sheet metal and comprise a planar mounting body which is located between appropriately shaped cover and base plates comprising the blade holder or hub and held therebetween against displacement by appropriately located pins or other suitable locking means. In the case of the cutting blades, these mounting bodies comprise segments of a circle and several are assembled end to end between the cover and base plates to complete the circle. Although the teeth of the cutting blades are disposed at right angles to said planar mounting body, it has been found advantageous to provide said teeth on the outer edge of a conical flange which is integrally related to the planar mounting body on its convex side. Thus each cutting blade comprises a planar annular segment having an inclined or conical section along its convex side and a toothed projecting section of a cylinder therealong. Both the planar segment and the conical section are backed by the cover and base plates which provide strength and back up to the upstanding teeth comprising the cylindrical section during the cutting or peeling action of the teeth on the tire periphery.

With the cutting teeth thus reinforced, the rasp and/or the tire mount may be moved relative to each other in order to expose and position the cutting teeth to peel relatively large thicknesses of material from the tire trend. Thus it is a feature of the invention that relatively thick layers can be peeled from the tire periphery at a relatively rapid rate and while consuming only low amounts of power and developing minimum amounts of heat and essentially little or no smoke and dust.

Still another feature of the invention is that the upper surface of the cover plate of the assembly may be provided with an annular recess in order to fully expose the depth of the teeth. This annular recess when given a concave shape in radial section receives the peeled strand of rubber as it is cut off the tire tread and directs it off the cover plate to a convenient waste container. This it is able to do with a minimum amount of inconvenience and so avoids any tendency for the cutting teeth to dig in or jam on the tread or otherwise to be hampered in their detreading of the tire carcass.

Many other advantages, features and objects of the invention will be at once apparent or will become so from the more detailed description of preferred forms of the invention which will now be described in connection with the accompanying drawings.

Referring first to said drawings:

FIG. 1 is a fragmented showing of a peeling device having cutting blades and buffing blades mounted therein in accordance with the invention and with sections cut away to illustrate both the manner of mounting the cutting and buffing blades and also their utility in peeling the rubber tread from the tire and in buffing the peeled tire surface to prepare the peripheral surface of a tire carcass for recapping;

FIG. 2 is a top plan view of the device shown partly in section and taken along lines 2—2 of FIG. 1 looking in the direction indicated by the arrows;

FIG. 3 is a top plan view of a preferred form of cutting blade comprising the invention;

FIG. 4 is a sectional view thereof taken along lines 4—4 of FIG. 3 and looking in the direction indicated by the arrows;

FIG. 5 is a fragmentary top plan view taken of the top edge of said blade and is taken along lines 5—5 of FIG. 4 looking in the direction indicated by the arrows;

FIGS. 6 and 7 are fragmented top plan and sectional views corresponding to FIGS. 4 and 5 respectively and illustrating a second embodiment of cutting blades according to the invention;

FIGS. 8 and 9 are fragmented, side elevational and top plan views respectively, and illustrate a third embodiment of cutting blade;

FIGS. 10 and 11 are fragmented, side elevational and top plan views of still another embodiment of cutting blade;

FIGS. 12 and 13 are fragmented top plan and sectional views showing still another embodiment of the invention in cutting blade;

FIG. 14 is a side elevational view and illustrates a further form of the invention;

FIG. 15 is a side elevational view illustrating a still further embodiment of the invention; and FIG. 16 illustrates still another embodiment of the invention in cutting blades for a tire peeler.

Referring now more particularly to the several views wherein like reference numerals are used to identify like parts, the invention is illustrated in FIG. 1 as embodied in a tire peeler assembly indicated generally at 20. Said peeler assembly comprises an intermediately located centrally apertured base plate 22, an outer centrally apertured cover plate 24 and an outer centrally apertured back plate 26 which with pins 36, as later described removably hold annular rows of cutting blades 28 and buffing blades 30 in spaced concentric arrangement about axis Y—Y of the tire rasp so as to expose their outer serrated working edges beyond the periphery of the hub for the cutting and buffing functions of the device as later described. Both the cutting blades 28 (FIG. 3) and buffing blades 30 (FIG. 2) are stamped or otherwise formed from suitable materials such as sheet metal to a generally concavo-convex shape comprising a predetermined angular section or arcuate segment of an annulus. In the illustrated examples the arcuate blades each have an angular extent of about 69° so that five blades are required to complete a full annular row. The outer convex or working edge of both the cutting and buffing blades is serrated and the inner or main body of said blades is provided with openings 32 and 34 which are spaced inwardly of their inner or convex edge.

Considering now FIG. 2 with FIG. 1, back plate 26 is provided with transversely extending pairs of pins 36 corresponding in number to the number of blades making up an annular row, in this instance five. Base plate 22 has similarly spaced complementary openings 38 through which said pins extend and cover plate 24 also has similarly spaced complementary openings 40 which receive said pins, the center to center spacings of each said pairs of pins and openings in the respective plates corresponding to the common center to center spacing of the openings 32 and 34 in both the cutting blades and the buffing blades. Although both openings 32 and 34 of the blades may be of a circular shape just large enough to receive the pins 36, preferably openings 34 have a more oval shape, the longer dimension of which extends in the direction of the arcuate extent of the blades and so facilitates assembly of the blades over said pins. The smaller diameter of said openings 34, however, corresponds to the diameter of the openings 32 in said blades to resist radial movement of the blades on the pins in the assembly.

As shown in FIG. 1, several rows of buffing blades 30 are mounted on said pins 36 between back plates 26 and base plate 22, the blades of each row being separated from adjacent rows by conventional I-beam aluminum spacers 42. Said spacers 42 each have a generally convexo-concave shape, an angular extent corresponding to that of the blades and are provided with through openings 44 having the same center to center spacing as pins 36. In FIGS. 1 and 2 the annular rows of buffing blades 30 are illustrated as in spaced parallel relation and forming annuli concentric with axis Y—Y of the blade assembly. However, the buffing blades may also be arranged in the form of a helix which spirals about said axis Y—Y. In this alternative arrangement the facing surfaces of base plate 22 and back plate 26 are provided with appropriately sloped sections and shoulders as is well known in the art, and for example is shown by FIGS. 10 and 12 described in lines 38–51 of column 3 of E. B. Jensen U.S. Pat. No. 3,082,506 issued Mar. 26, 1963. Between base plate 22 and outer cover plate 24 is a single annular row of cutting blades 28 also mounted by said pins 36.

The peeling device thus described is mounted in conventional manner so as to rotate on its axis Y—Y and so that the serrated edge of its cutting blades 28 and then the serrated edge of the buffing blades 30 are presented in that order to traverse the peripheral surface of the more slowly rotating tire carcass being prepared for recapping, said travesing movement of the assembly being at right angles, or nearly so, to the direction in which the tire carcass is rotated. Thus as shown in FIG. 1, assembly 20 is mounted on the reduced end S of a motor-rotated shaft M as by one or more nuts N which threadedly connect to the outer end of S. Nut N when tightened thereon serves to hold the assembly tightly against shoulder or flange F of the shaft M so that the blades assembled between the plates of the hub or holder rotate therewith on axes Y—Y. Shaft M in turn is so disposed that axis Y—Y is perpendicular to plane X—X which includes the axis on which the tire carcass rotates. The hub assembly is effectively located with respect to said plane X—X utilizing one or more spacers 46 as necessity dictates.

In accordance with the illustrated embodiments of the invention, the serrated edges of the cutting blades 28 comprise teeth 48 which as best seen in FIG. 1 extend generally parallel to the axis Y—Y on which the assembly rotates and are so shaped that when presented to the worn tread of the rotating tire carcass periphery they effectively peel the tread therefrom as it feeds into the traversely moving teeth 48. The serrated edge of the buffing blade 30, however, comprise teeth 50 which extend generally radial with respect to said rotational axis and slightly beyond the extent of said cutting teeth 48. The buffing blade teeth 50 thus penetrate the peeled surface to a supeficial depth, but which is sufficient to impart a texture to the peeled surface of the tire carcass with which the subsequentially applied rubber strongly bonds on vulcanization.

Any suitable means as conventionally known may be utilized to move either the tire carcass mount or the blade assembly mount, including shaft M, toward and away from the other in order to control the depth or thickness of the peel which is removed. Suitable means as conventionally known will also be utilized to move either shaft M with the tire peeling assembly thereon or the tire carcass mount through a plane parallel to said plane X—X in order that said peeling and buffing actions may be extended across the width of the tire carcass periphery and to provide said periphery with the shape required.

Considering now FIGS. 3, 4 and 5 with said FIG. 1, each of cutting blades 28 comprises an arcuate planar main body 52 which contains the mentioned openings 32 and 34 adjacent its concave edge and by which the cutting blades can be arranged in the form of an annulus and secured by pins 36 between the base plate 22 and cover plate 24. The outer convex edge of said blades includes an outwardly inclined or conical flange portion integral with said planar main body and from which projects the mentioned teeth 48. As already indicated, teeth 48 are disposed at right angles or perpendicular to the planar body portion 52 of the cutting blades and thus may be considered to represent a cylindrical section which, when the blades are properly assembled between the base and cover plates, is concentric with the axis Y—Y on which the assembly rotates. The inclined flange or conical portion 54 of the cutting blades is preferably disposed at 45 degrees to the plane of the main body portion 52. However, it may be inclined at any other suitable angle less than 90 degrees.

As illustrated in FIG. 1, the facing surfaces of base plate 22 and cover plate 24 comprise planar parallel annular surfaces 56 and 58 which engage on opposed surfaces of the planar mounting portion 52 of the blades. Said facing surfaces of the base and cover plates also have surrounding inclined conical surfaces 60 and 62 which engage the opposite surfaces of the inclined flange 56 of the cutting blades to firmly locate the blades and back up any resistance to the cutting action of the teeth 48. Under some circumstances, the conical outer portion of base 22 providing surface 60 may be omitted and/or the base plate 22 itself omitted. The upper surface of the cover plate 30 is also provided with a recess 64 adjacent its outer periphery which provides clearance for and exposes the full depth of the teeth 48 of the cutting blades. Recess 64 in radial section has a concave shape which serves to direct the peeled rubber strands P off the rotating hub 20 to appropriately located collecting areas or waste containers.

In the embodiment of the invention illustrated by FIGS. 1 through 3, 4 and 5, the cutting blade teeth 48 are equi-sized and spaced apart by equi-sized circular cutouts 64 which interrupt the outer edge of the blade. These circular cutouts 64 comprise major arcs (greater than 180°) so as to impart the illustrated dove-tail shape to the teeth which are characterized by outwardly diverging leading and trailing side edges 66 and 68 of concave shape and a relatively wide outer edge 70, which although slightly convex, approximately parallels the main body portion and thereby plane X—X when assembled between base plate 22 and cover plate 24. The positive rake angle at which the outer portion of the leading edge of the teeth 48 is disposed provides a sharp intersection or prong 72 with the top edge 70 of the blade. It will be understood that this is true in which ever direction the peeling device is rotated about its axis Y—Y. Thus depending on the direction in which the hub and/or blade assembly is rotated on its axis Y—Y, either side edge 66 or 68 may constitute the leading edge of the cutting blade teeth.

Considering, however, the tire carcass T to be rotating in the direction indicated by arrow A in FIG. 1, and the hub to be rotating in the direction indicated by arrow 74 in FIG. 5, it will be understood that prong 72 of the leading side edge 66 of the cutting blade teeth digs into the tire periphery and moves transversely thereacross. Simultaneously the relatively wide outer or top edge 70 of the teeth is presented to the tire tread in a direction considered generally normal to said plane X—X and against the rotation of the tire carcass. Consequently, as prong 72 and the leading side edge 66 of the teeth cut into and beneath the tire tread, the outer edge 70 of the teeth cooperate therewith to effectively lift and separate a peel from the tire carcass perhiphery, the depth or thickness of the peel being dependent only on the depth to which the peeler has been moved relative to the action on which the tire carcass rotates. Said peeling action of the cutting teeth is enhanced by offsetting the teeth, sharpening the outer and/or leading side edges or by embossing the cutting blade teeth at least along their leading side edges 66 so that said edges are offset or deflected outwardly from axis Y—Y at a small angle. This is illustrated best in FIG. 5 and experience has found that this angle should be between 5 and 50 degrees, although it is most useful when in the order of 20 to 30 degrees. The resultant outward deflection of the leading edge 66 of the cutting teeth or prong 72 has been found to facilitate the lifting off or separating of the peel from the rotating tire carcass. In the embodiment illustrated by FIG. 5, for example, the rear or trailing edge 68 of the teeth is also similarly embossed and it has been found that the thus deflected prong 76 which the trailing side edge 68 of the teeth provides with the outer edge 70 tends to break up the peel or strand P into smaller lengths depending on the related dimensions and speed of the tire peeler. At the conventional speeds and blade sizes employed, these small lengths of peeling have been found to be in the order of two or three inches in length, and represent a size which can be more readily handled than longer strands. Where, as in the embodiment illustrated by FIG. 8, only the leading edge 66 of the cutting blade teeth are so embossed, the tread is peeled off the tire periphery as a continuous strand or one of indefinite length. The embodiment as illustrated by FIGS. 3–5 is thus to be preferred. Not only are the shorter lengths of peel more easily handled, but at the same time they are also of sufficient length that they constitute no dust problem. The concave shape imparted to the leading and trailing side edges as thus described is not only a shape easy to form and emboss using conventional equipment, and in the least expensive manner, but the concave shape of the leading edge of said teeth provides an inner edge 80 near the base of each tooth which as shown in FIG. 1 is not only oppositely inclined to the diverging upper portion of the leading side edge which forms prong 72, but actually sufficiently approaches the disposition of the outer edge 70 that it is able to cooperate therewith to provide a secondary edge which, when sharpened, promotes the peeling action.

The desired peeling action of the teeth, however, may also be achieved where the teeth are separated by other than circular cut outs. For example, the dove-tail shape of the cutting blade teeth 48 may take the forms illustrated by FIGS. 14 and 15. The form illustrated by FIG. 15 is, however, less satisfactory. Not only does the uniform diverging relation of its leading and trailing side edges along their full length omit the inner cutting edge 80 which characterizes the FIG. 1 embodiment, but the shape of the cutting teeth introduce manufacturing problems.

Although it is usually preferable to emboss at least the leading and usually the trailing side edges of all the teeth, as in the case of FIGS. 3–5 embodiment, useful results can be obtained where a lesser number of the trailing and/or leading edges of the teeth are so embossed. Thus FIGS. 10 and 11 illustrate an embodiment of the invention wherein only the leading and trailing edges of every other tooth are embossed.

The attack of the outer edge 70 of the teeth to peel the tread from the tire periphery can be improved by beveling or sharpening said edges as is illustrated at 82 in the embodiment of FIGS. 6 and 7. Optionally, the beveling or sharpening of said outer edge 70 may be applied to the opposite side of the blade as illustrated at 84 in FIG. 13. It may also be provided on both sides to give a V-shape to the outer cutting edge of the blade teeth as illustrated at 86 in FIG. 16. As illustrated by FIG. 12, the side edges of the teeth may be sharpened by honing the embossments with a stone. Not only may this sharpening of the cutting teeth be done intentionally, but it also naturally occurs as a result of the wearing of the teeth. Shredded wire found in the tread of tire carcasses, particularly has this effect. Thus, the teeth are essentially self sharpening so that their use tends to be maximized. Because of the attack angle that the cutting blade teeth 48 have to the rubber tread in the peeling action, the teeth have greater resistance to breakage when contacting small stones and other foreign objects lodged in the tread, and which in the past has been a considerable problem. Because the cutting action of the blade teeth 48 is the combined effect of the relative movement of the teeth both against and across the tire periphery, but always substantially parallel, or perhaps more accurately tangential to the tire periphery, not only is power consumption reduced and the generation of heat less a problem, but the peeler can now be operated at higher r.p.m. Also, there is less of a problem of the cutting teeth binding and/or breaking. Thus relatively thick strands or peels of tire tread can be rapidly removed and the peripheral surface of the tire carcass quickly reshaped to that required for the recapping operation.

Turning now back to FIG. 1, as peel P is removed from the tire periphery, the remaining surface is immediately presented to the cutting action of the teeth 50 of the buffing blades 30. As illustrated perhaps best by FIG. 2, the teeth 50 of the buffing blades in contrast to the disposition of the teeth of the cutting blades 28 lie generally in the plane of the main body of the blade and therefore are disposed more nearly radial and parallel to plane X—X when assembled between base plate 22 and outer plate 26 in the assembly. They also extend a distance from axis Y—Y sufficiently further than the extent of the cutting blade teeth 48, so that they superficially cut into the tire carcass peripheral surface imparting a characteristic texture to which the added rubber has an affinity and strongly bonds on vulcanization. In practice it has been found that the buffing blade teeth should extend about $\frac{1}{32}''$ further than do the cutting plate teeth, but not more than about $\frac{1}{8}''$. Unlike the cutting blade teeth, the outer edge of the buffing blade teeth may be provided with a notch as indicated at 90 and which is preferably less than one-half the depth and pitch of the teeth. The buffing blade teeth 50 may be disposed in the plane of the main body or be given a slight twist out of an exact plane parallel with plane X—X such that they lie in spaced parallel planes relative to each other, but at a small transverse angle with respect to the main body portion of the buffing blades 30. Also, as shown in FIG. 1, every other tooth may be oppositely twisted at said angle. It is preferred that the buffing blades be constructed as illustrated in the aforementioned Emil B. Jensen United States Letters Pat. 3,082,506, issued Mar. 26, 1963. However, buffing blades with other shapes of teeth may also be useful under some circumstances.

As indicated, to achieve their buffing function and reduce the texture of the tire carcass periphery to a desired smoothness and/or fineness with which the newly applied rubber will bond on vulcanizing, the teeth 50 of the buffing blades 30 must superficially penetrate and/or abrade the remaining tire carcass surface behind the peeled tread. Such a cutting or abrading action necessarily produces some amount of smoke and/or fine granules. The radial extent of the teeth of said buffing blades, however, is sufficiently minute to be in the order of $\frac{1}{32}''$ and usually not greater than about $\frac{1}{8}''$. It has been found in practice that the amount of smoke and dust produced thereby is still so small that the smoke and dust factor is nevertheless cut at least in half and more usually represents a reduction of 80% over prior art practices wherein rasps are utilized to abrade or otherwise pulverize the old tread to reduce it to required shape.

Although as thus far described, hub 20 employs both a row of cutting blades 28 which peel the old rubber tire tread from the worn tire carcass and several spaced rows of buffing blades 30 which simultaneously buffs the peeled surface to a required texture, it will be understood that the peeling action and the buffing action can be obtained separately. For example, a suitable tire peeling tire assembly could be constructed utilizing base plate 22 and cover plate 30 with a row of cutting blades 28 sandwiched therebetween. In this event, base plate 22 would be modified to include mounting pins 36. In this event, also, the tire carcass may be treated after peeling, if necessary, to a conventional rasping operation untilizing a rasp, for example, as described in the aforementioned E. B. Jensen Pat. 3,082,506.

It will be further understood that the assembly 20 might be mounted in reverse on shaft M so that the cutting blades 28 are below the buffing blades 30, if the rotation of the tire carcass T is also reversed. It will also be understood that in the embodiments of the invention as illustrated the outer peripheral edge of base plate 22, when used, is also beveled on its under side as indicated at 92 in order to provide a space therebetween and the first cutting blade teeth 50 to enhance the cooling thereof and also to expose the same for their intended buffing function.

Thus it will be understood from the above description that all the recited objects, advantages and features of the invention have been demonstrated as obtainable and in a highly practical manner utilizing blades and/or mounting structure therefor which are convenient and economical to manufacture, as well as utilize.

Thus having described my invention, I claim:

1. Replaceable blade for a rotatable tire peeler comprising an essentially planar body portion having an angularly-related flange along one side thereof, said flange terminating in an outer edge which curves inwardly through a plane spaced above and generally parallel to said planar body portion, said outer edge embodying a convexly arranged array of upstanding spaced teeth, each with outwardly diverging opposed leading and trailing side edges, said teeth being disposed generally perpendicular to said planar body portion.

2. Replaceable tire peeler blade as claimed in claim 1 wherein only the outer portions of the opposed side edges of the teeth diverge outwardly, the inner portions of said opposed side edges diverging inwardly to impart a generally concave-like shape to said opposed side edges.

3. Replaceable tire peeler blade as claimed in claim 1 wherein at least one side edge of some of said teeth have a narrow portion along the length thereof which is offset to the convex side of said array.

4. Replaceable tire peeler blade as claimed in claim 3 wherein the offset of said narrow portion is in the order of 20 to 30 degrees.

5. Replaceable tire peeler blade as claimed in claim 1 wherein each of said teeth has a sharpened outer edge.

6. Replaceable tire peeler blade as claimed in claim 1 wherein the leading side edge of some of said teeth is sharpened.

7. Replaceable blade for a rotatable tire peeler comprising a sheet metal member having an essentially planar mounting portion and a laterally inclined flange extending longitudinally of said mounting portion, said laterally inclined flange terminating in an outer edge which is convexly curved inwardly through a plane spaced to one side and generally parallel to said planar mounting portion and embodies an array of spaced cutting teeth each having opposed concave-like side edges which intersect said outer edge and form therewith acuately pointed leading and trailing ends.

8. Replaceable blade for a rotatable tire peeler as claimed in claim 7 wherein at least one of the side edges of some of said teeth is offset along the length thereof.

9. Replaceable blade for a rotatable tire peeler as claimed in claim 8 wherein the outer edge of the teeth is acutely sharpened.

10. Replaceable blade for a rotatable tire peeler comprising a sheet metal member having an essentially planar mounting portion and a laterally inclined portion extending longitudinally of said mounting portion, said laterally inclined portion terminating in an outer edge portion which embodies an array of spaced cutting teeth convexly arranged longitudinally of the planar mounting portion, said teeth each having an outer edge and opposed concave-like side edges which intersect said outer edge and form therewith acutely pointed leading and trailing ends, the sheet metal member comprising an arcuate segment of an annulus and its laterally inclined portion having a conical disposition substantially concentric with said annulus.

11. Replaceable blade for a rotatable tire peeler comprising a sheet metal member having an essentially planar mounting portion and a laterally inclined portion extending longitudinally of said mounting portion, said laterally inclined portion terminating in an outer edge portion which embodies an array of spaced cutting teeth convexly arranged longitudinally of the planar mounting portion, said teeth each having an outer edge and opposed concave-like side edges which intersect said outer edge and form therewith acutely pointed leading and trailing ends, the laterally inclined portion being at an angle less than 90° to the mounting portion, and the cutting teeth of its outer edge portion being generally perpendicular to said mounting portion.

12. Replaceable blade for a rotatable tire peeler comprising a sheet metal member having an essentially planar mounting portion and a laterally inclined portion extending longitudinally of said mounting portion, said laterally inclined portion terminating in an outer edge portion which embodies an array of spaced cutting teeth convexly arranged longitudinally of the planar mounting portion, said teeth each having an outer edge and opposed concave-like side edges which intersect said outer edge and form therewith acutely pointed leading and trailing ends, the laterally inclined portion being generally conical and the outer portion being generally cylindrical about coincident axes disposed normal to said planar mounting portion.

13. Replaceable blade for a rotatable tire peeler as claimed in claim 12 wherein at least one of the side edges of some of said teeth are embossed along the length thereof.

14. Replaceable blade for a rotatable tire peeler as claimed in claim 13 wherein the outer edge of the teeth is acutely sharpened.

15. Replaceable blade for rotatable tire peeler as claimed in claim 12 wherein the side edges of every other tooth are embossed.

16. Replaceable blade for rotatable tire peeler as claimed in claim 15 wherein the outer edges of the teeth are sharpened.

17. Replaceable blade for rotatable tire peeler as claimed in claim 12 wherein at least one side edge and the outer edge of the teeth are sharpened.

18. Replaceable blade for a rotatable tire peeler comprising a sheet metal member embodying a main planar body having a convex shaped outer side and mounting means spaced inwardly therefrom, and a laterally inclined conical flange portion integral with said convex shaped outer side and terminating in a cylindrical working edge disposed generally perpendicular to the plane of said main body of the blade.

19. Replaceable blade for a rotatable tire peeler comprising a sheet metal member having an essentially planar mounting portion and a laterally inclined flange portion extending longitudinally the length of one side of said mounting portion, said laterally inclined flange portion terminating in an outer working edge portion which includes an array of spaced cutting teeth convexly arranged longitudinally of the planar mounting portion and at an angle thereto, the outer edge of said teeth defining a plane spaced above and generally parallel to the planar mounting portion and said teeth having opposed outwardly diverging side edges which intersect said outer edge and form therewith leading and trailing pointed ends, at least one of the side edges of some of said teeth being offset along at least a portion of the length thereof.

20. Replaceable blade for a rotatable tire peeler comprising a sheet metal member having an essentially planar mounting portion and an angularly-disposed lateral flange portion extending along one side of said mounting portion, said lateral flange portion terminating in an outer array of spaced cutting teeth the outer edges of which lie in a plane disposed to one side of and generally parallel to said planar mounting portion, said teeth further having opposed leading and trailing side edges, at least a portion of one of said side edges of some of said teeth being offset with respect to other portions of said teeth.

References Cited

UNITED STATES PATENTS

| | | | |
|---|---|---|---|
| 1,579,888 | 4/1926 | Raszl | 29—105 |
| 2,896,309 | 7/1959 | Jensen | 29—79 |
| 3,351,997 | 11/1967 | Neilsen | 29—79 |

HARRISON L. HINSON, Primary Examiner

U.S. Cl. X.R.

29—105